United States Patent
Yi et al.

(10) Patent No.: US 11,122,640 B2
(45) Date of Patent: Sep. 14, 2021

(54) METHOD AND APPARATUS FOR HANDLING SOFT BUFFER SIZE WITH DUAL CONNECTIVITY IN WIRELESS COMMUNICATION SYSTEM

(71) Applicant: LG Electronics Inc., Seoul (KR)

(72) Inventors: Yunjung Yi, Seoul (KR); Youngtae Kim, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/631,130

(22) PCT Filed: Jul. 30, 2018

(86) PCT No.: PCT/KR2018/008612
§ 371 (c)(1),
(2) Date: Jan. 14, 2020

(87) PCT Pub. No.: WO2019/022587
PCT Pub. Date: Jan. 31, 2019

(65) Prior Publication Data
US 2020/0236728 A1     Jul. 23, 2020

Related U.S. Application Data

(60) Provisional application No. 62/537,966, filed on Jul. 28, 2017.

(51) Int. Cl.
*H04W 76/16*     (2018.01)
*H04L 1/18*      (2006.01)
(Continued)

(52) U.S. Cl.
CPC .......... *H04W 76/16* (2018.02); *H04L 1/1835* (2013.01); *H04L 5/0082* (2013.01);
(Continued)

(58) Field of Classification Search
CPC ... H04L 1/1835; H04L 5/0082; H04L 5/0092; H04W 76/16; H04W 8/22; H04W 8/24
See application file for complete search history.

(56) References Cited

U.S. PATENT DOCUMENTS

2015/0124740 A1*  5/2015  Chen ...................... H04L 5/001
                                               370/329
2015/0208366 A1*  7/2015  Papasakellariou .... H04L 1/1861
                                               370/311
(Continued)

FOREIGN PATENT DOCUMENTS

EP       3361820       8/2018
EP       3579472       12/2019

OTHER PUBLICATIONS

NTT Docomo; "Soft Buffer Partitioning and Rate Matching for Downlink CA"; 3GPP TSG RAN WG1 Meeting #63bis Dublin, Ireland, Jan. 17-21, 2011; R1-110555 (Year: 2011).*
(Continued)

*Primary Examiner* — Gary Mui
(74) *Attorney, Agent, or Firm* — Fish & Richardson P.C.

(57) ABSTRACT

A method and apparatus for handling a soft buffer size in a wireless communication system is provided. It is assumed that a user equipment (UE) is connected to both a long-term evolution (LTE) system and a new radio access technology (NR) system in dual connectivity. The UE determines a first UE capability for the LTE system and a second UE capability for the NR system, determines a total soft buffer size based on the first UE capability and the second UE capability, and shares the total soft buffer size between the LTE system and the NR system based on at least one of a maximum transport block size (TBS) per transmission time interval (TTI) and a number of carriers used in the NR system.

14 Claims, 11 Drawing Sheets

(51) Int. Cl.
  *H04L 5/00* (2006.01)
  *H04W 8/24* (2009.01)
  *H04W 88/06* (2009.01)
(52) U.S. Cl.
  CPC ............ *H04L 5/0092* (2013.01); *H04W 8/24* (2013.01); *H04W 88/06* (2013.01)

(56) References Cited

U.S. PATENT DOCUMENTS

| | | | |
|---|---|---|---|
| 2015/0282138 A1* | 10/2015 | Choi | H04L 1/1874 370/329 |
| 2015/0304074 A1* | 10/2015 | Seo | H04W 74/006 370/329 |
| 2015/0312371 A1 | 10/2015 | Han et al. | |
| 2016/0191225 A1* | 6/2016 | Hwang | H04W 72/1252 370/330 |
| 2016/0227540 A1* | 8/2016 | Chen | H04L 5/0064 |
| 2017/0201984 A1* | 7/2017 | Fu | H04L 1/1864 |
| 2017/0202009 A1* | 7/2017 | Kim | H04W 72/1284 |
| 2017/0222763 A1* | 8/2017 | Lee | H04L 1/1812 |
| 2017/0280447 A1* | 9/2017 | Uchino | H04L 1/1845 |
| 2018/0227938 A1* | 8/2018 | Lee | H04L 5/0053 |
| 2018/0249366 A1* | 8/2018 | Takahashi | H04L 1/1835 |
| 2018/0309547 A1* | 10/2018 | Cheng | H04L 1/1845 |
| 2019/0141770 A1* | 5/2019 | Takahashi | H04W 8/24 |
| 2019/0356426 A1* | 11/2019 | He | H04L 1/1822 |
| 2019/0394000 A1* | 12/2019 | Kim | H04W 72/04 |

OTHER PUBLICATIONS

Ericsson, Alu; "WF on DL-SCH Soft Channel Bits n Dual-Connectivity"; 3GPP TSG RAN WG1 #77 Seoul, Korea, May 19-23, 2014 Agenda item 6.2.4; R1-142677 (Year: 2014).*

Extended European Search Report in European Appln. No. 18838097.6, dated May 27, 2020, 11 pages.

Intel Corporation, Initial discussion on TS38.306 skeleton, R2-1704806, 3GPP TSG RAN WG2#98, Hangzhou, China, May 15-19, 2017, 6 pages.

Nokia, Alcatel-Lucent Shanghai Bell, UE capability structure and coordination aspects for LTE/NR DC, R2-1704345, 3GPP TSG-RAN WG2 Meeting #98, Hangzhou, China, May 15-19, 2017, 14 pages.

Ericsson, "UE capability coordination for LTE-NR interworking", R2-1706577, 3GPP TSG-RAN WG2 NR#2, Qingdao, China, Jun. 27-29, 2017, 9 pages.

Huawei, HiSilicon, "Soft buffer handling", R1-1709966, 3GPP TSG RAN WG1 NR Ad-Hoc Meeting, Qingdao, China, Jun. 27-30, 2017, 3 pages.

NTT Docomo, Inc., "Initial views on UE category", R1-1711055, 3GPP TSG RAN WG1 NR Ad-Hoc#2, Qingdao, P.R. China Jun. 27-30, 2017, 4 pages.

Samsung, "UE categories for EN DC and NR", R2-1707391, 3GPP TSG-RAN WG2 NR Ad-hoc #2, Qingdao, China, Jun. 27-29, 2017, 3 pages.

* cited by examiner

METHOD AND APPARATUS FOR HANDLING SOFT BUFFER SIZE WITH DUAL CONNECTIVITY IN WIRELESS COMMUNICATION SYSTEM

CROSS-REFERENCE TO RELATED APPLICATIONS

This application is a National Stage application under 35 U.S.C. § 371 of International Application No. PCT/KR2018/008612, filed on Jul. 30, 2018, which claims the benefit of U.S. Provisional Application No. 62/537,966 filed on Jul. 28, 2017. The disclosures of the prior applications are incorporated by reference in their entirety.

TECHNICAL FIELD

The present invention relates to wireless communications, and more particularly, to a method and apparatus for handling a soft buffer size when dual connectivity is configured between a long-term evolution (LTE) system and a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In LTE/LTE advanced (LTE-A), a user equipment (UE) may support dual connectivity (DC) operation. In DC, a multiple reception (Rx)/transmission (Tx) UE in a radio resource control (RRC) connected state is configured to utilize radio resources provided by two distinct schedulers, located in two eNBs (eNodeBs) connected via a non-ideal backhaul over the X2 interface. eNBs involved in DC for a certain UE may assume two different roles: an eNB may either act as a master eNB (MeNB) or as a secondary eNB (SeNB). In DC, a UE is connected to one MeNB and one SeNB.

SUMMARY

A UE may be configured with dual connectivity between LTE and NR. In other words, both LTE and NR may involve in dual connectivity, in which one system act as a master node (MN) and the other system act as a secondary node (SN). There may be need to discuss mechanisms for soft buffer size sharing/partitioning/handling for a UE configured with dual connectivity between LTE and NR.

In an aspect, a method for handling a soft buffer size by a user equipment (UE) in a wireless communication system is provided. The UE is connected to both a long-term evolution (LTE) system and a new radio access technology (NR) system in dual connectivity. The method includes determining a first UE capability for the LTE system and a second UE capability for the NR system, determining a total soft buffer size based on the first UE capability and the second UE capability, and sharing the total soft buffer size between the LTE system and the NR system based on at least one of a maximum transport block size (TBS) per transmission time interval (TTI) and a number of carriers used in the NR system.

In another aspect, a user equipment (UE) in a wireless communication system is provided. The UE is connected to both a long-term evolution (LTE) system and a new radio access technology (NR) system in dual connectivity. The UE includes a memory, a transceiver, and a processor, operably coupled to the memory and the transceiver, that determines a first UE capability for the LTE system and a second UE capability for the NR system, determines a total soft buffer size based on the first UE capability and the second UE capability, and shares the total soft buffer size between the LTE system and the NR system based on at least one of a maximum transport block size (TB S) per transmission time interval (TTI) and a number of carriers used in the NR system.

Soft buffer size can be shared efficiently between LTE and NR.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
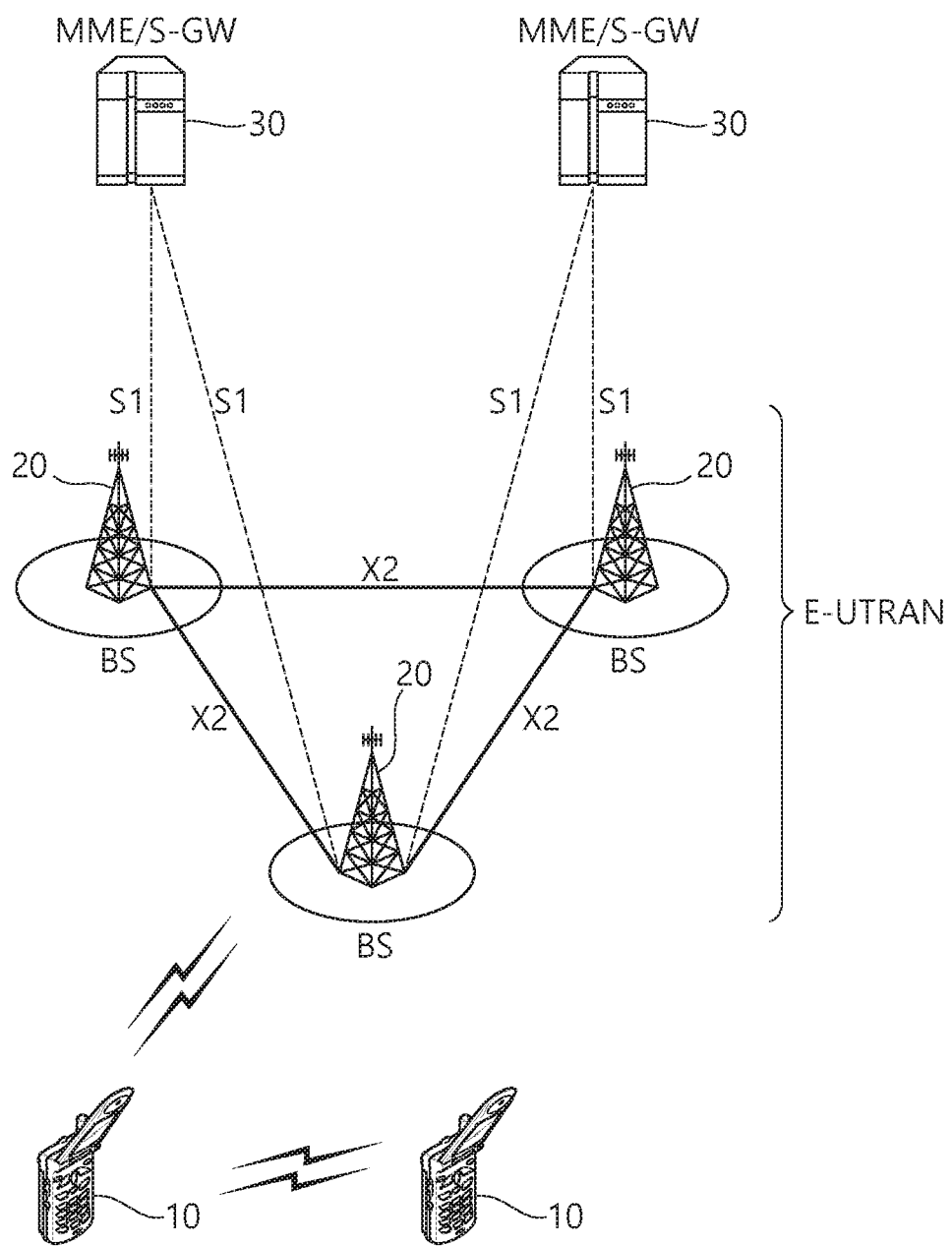
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
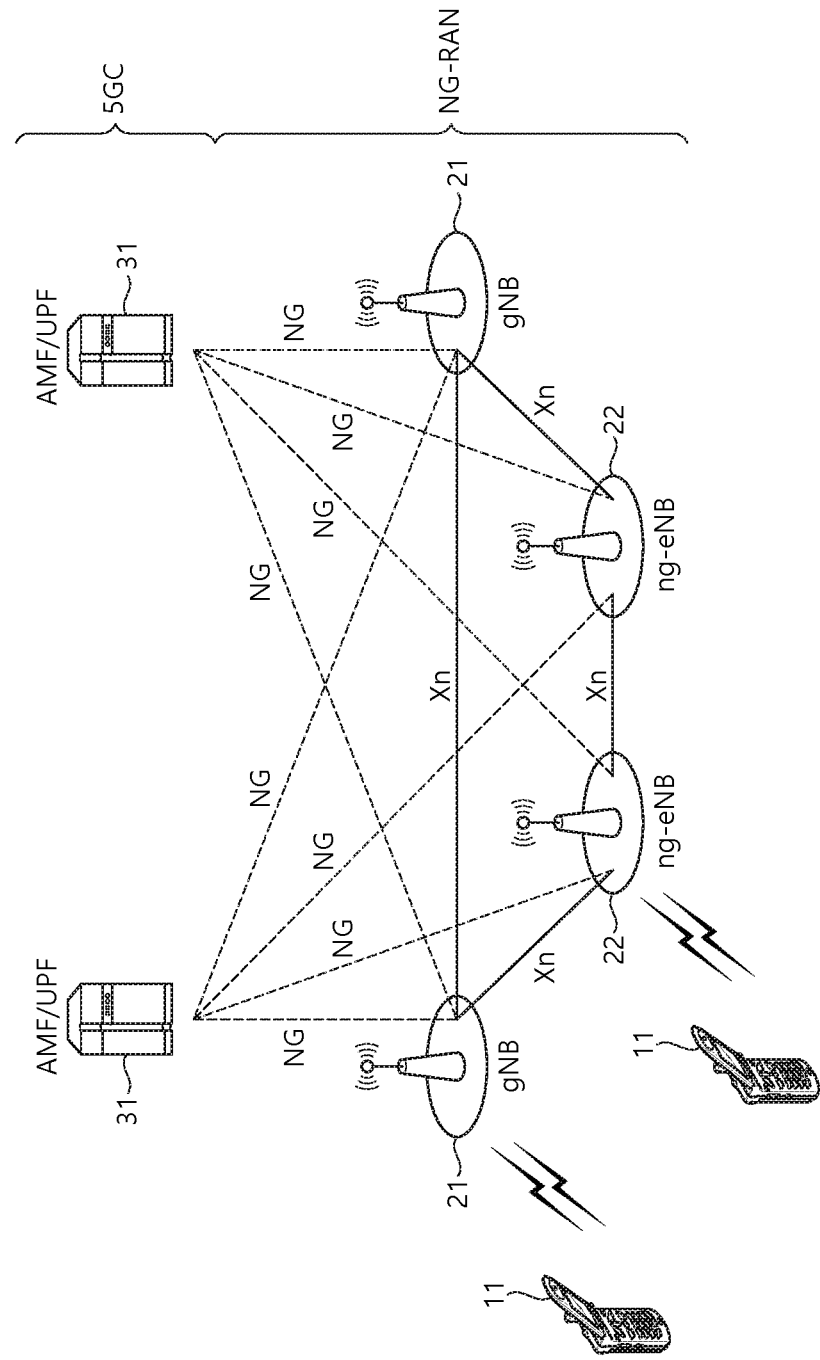
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
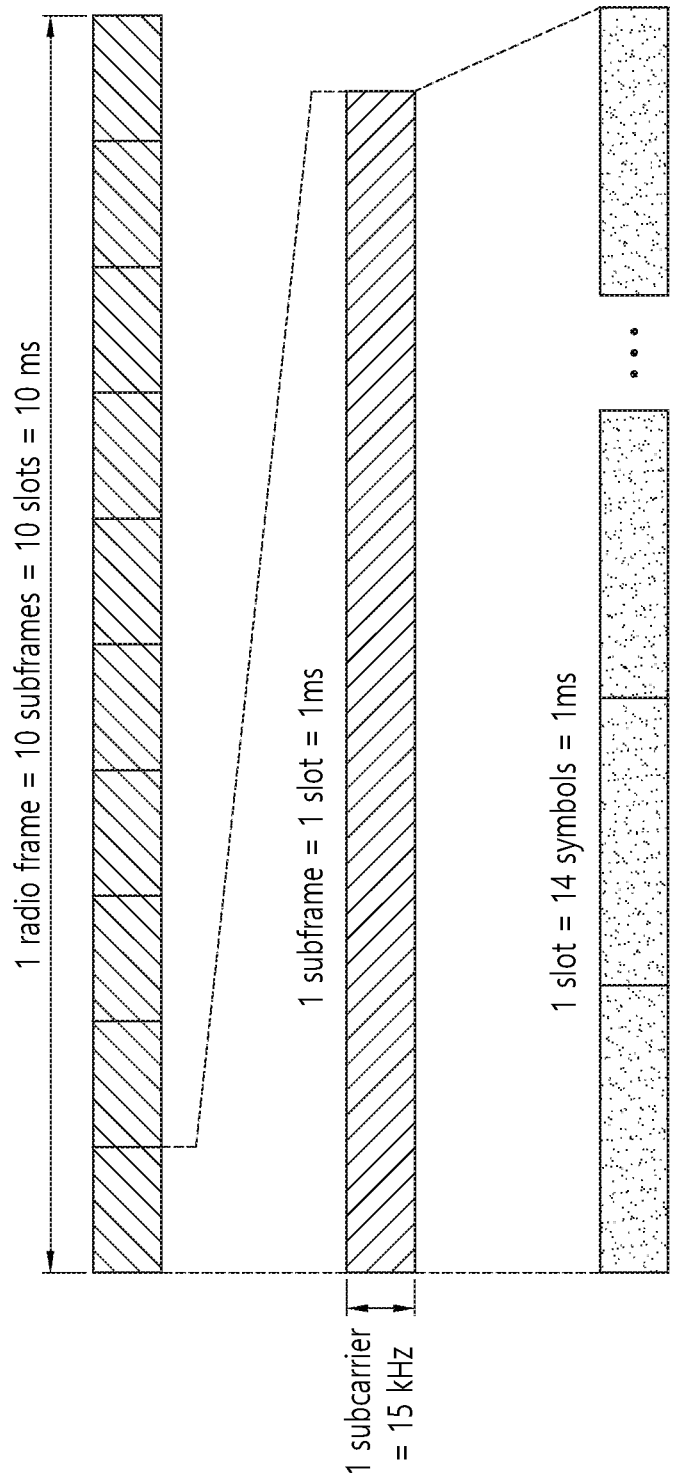
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to μ=0.

Figure 4:
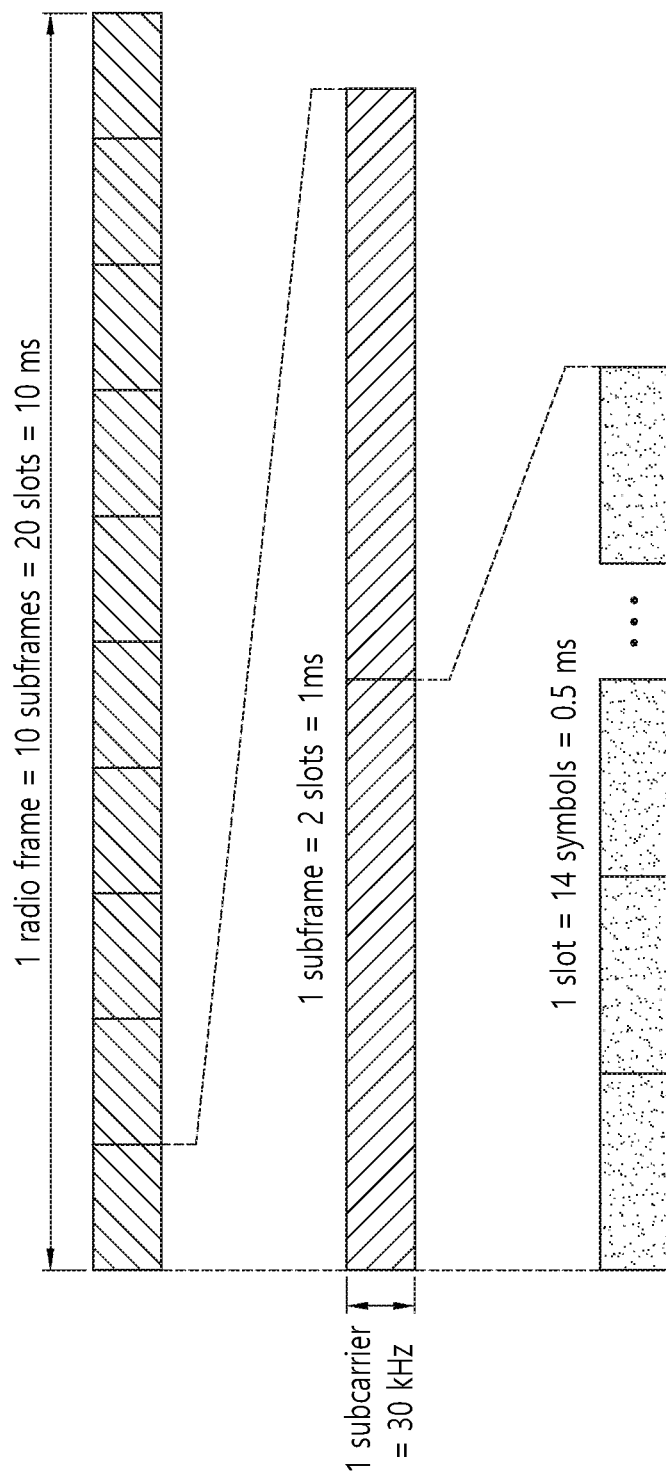
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to μ=1.

Table 3 shows an example of a number of OFDM symbols per slot, slots per radio frame, and slots per subframe for extended CP.

TABLE 3

| μ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| . . . | . . . | . . . | . . . | . . . | . . . | . . . | . . . | . . . | . . . | . . . | . . . | . . . | . . . | . . . |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
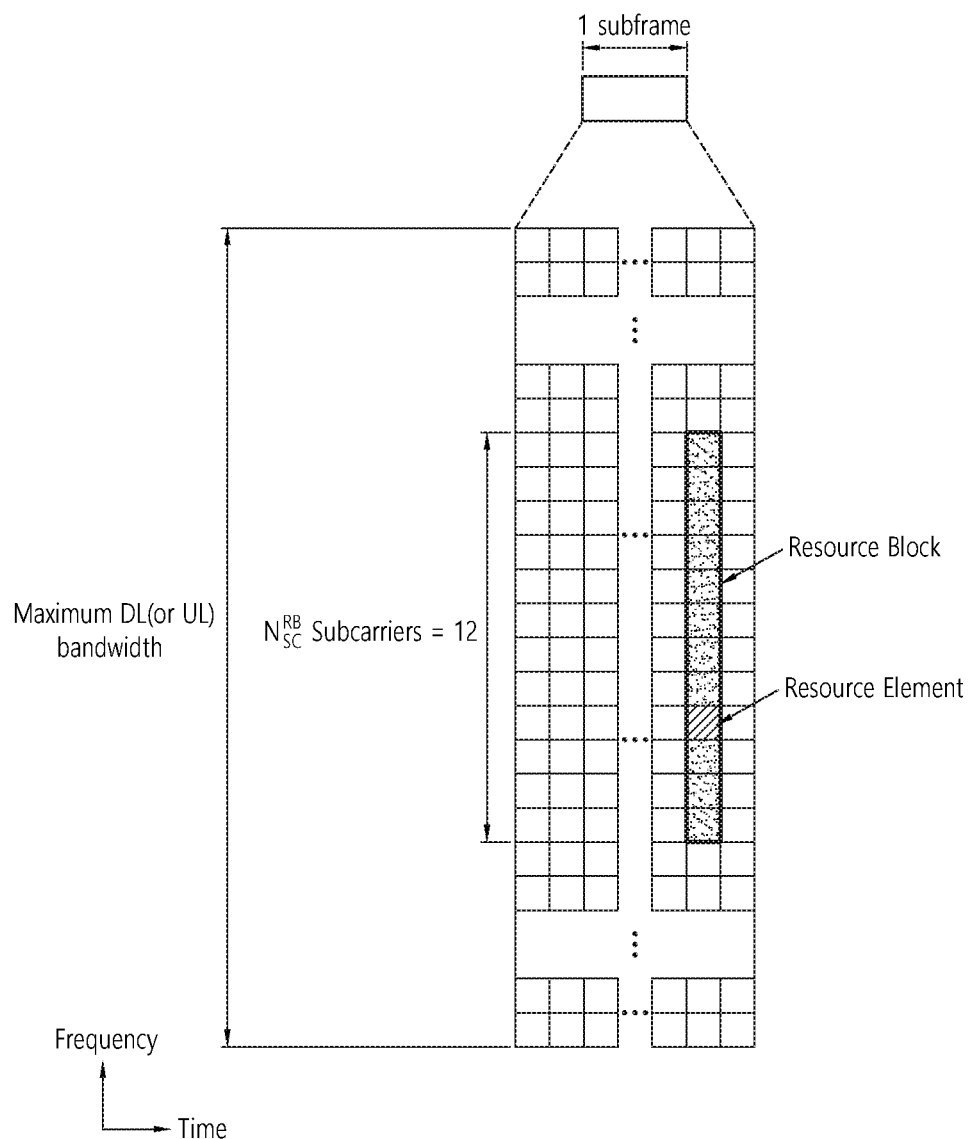
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("$\mu$"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
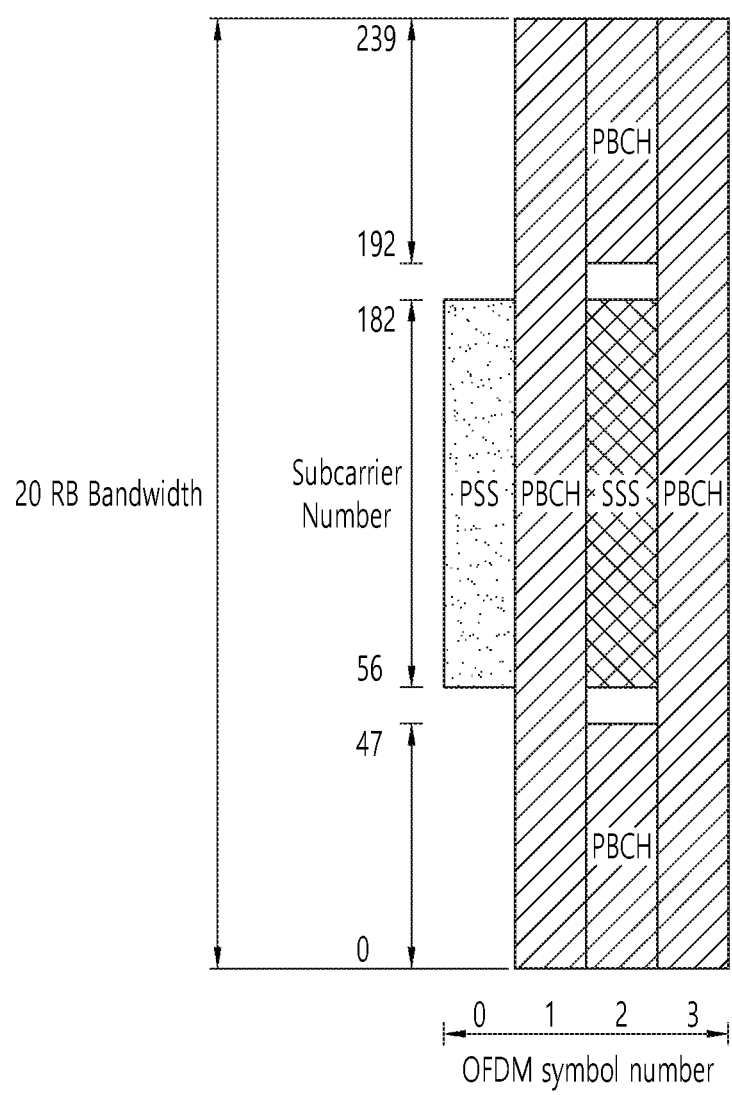
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
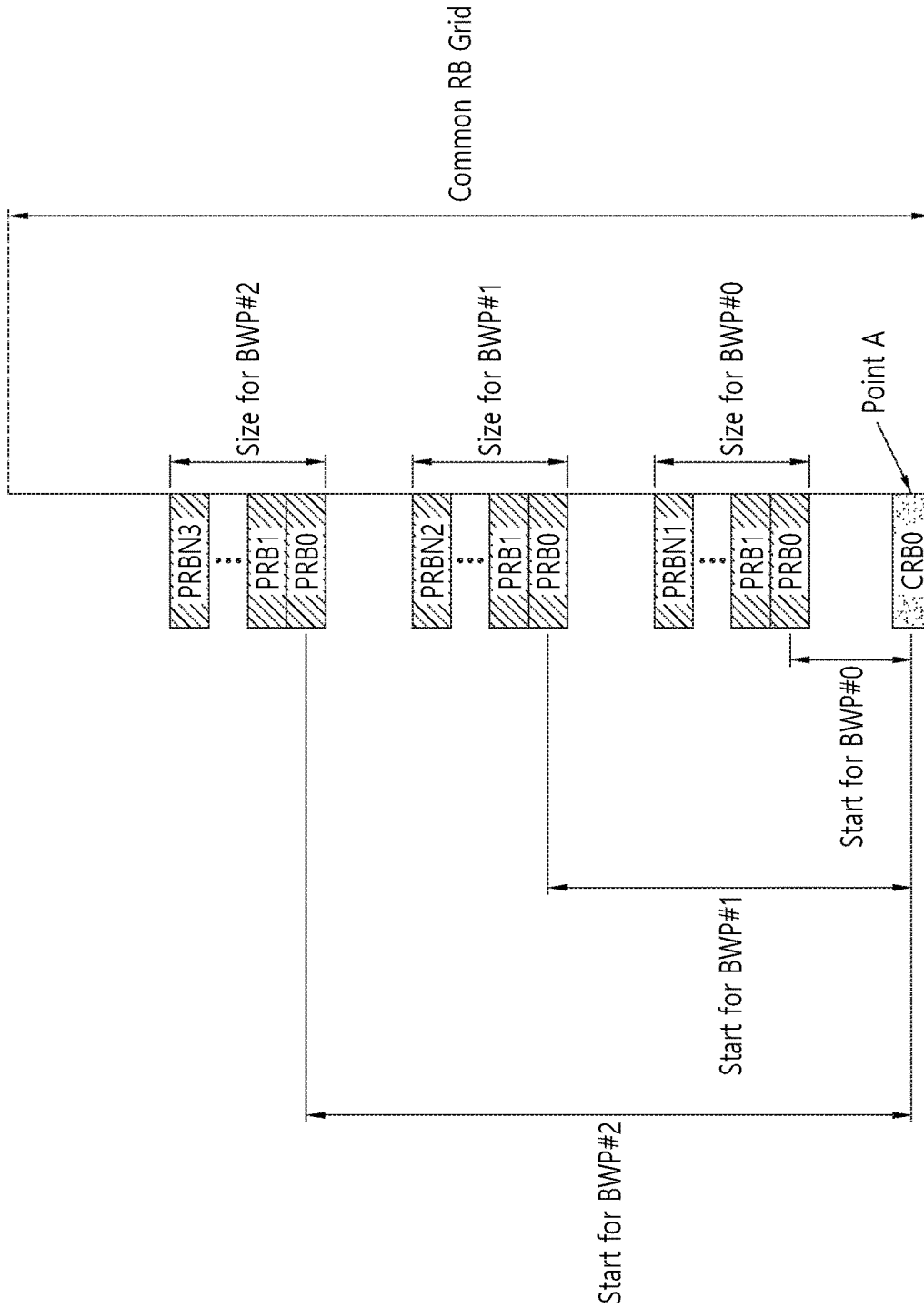
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
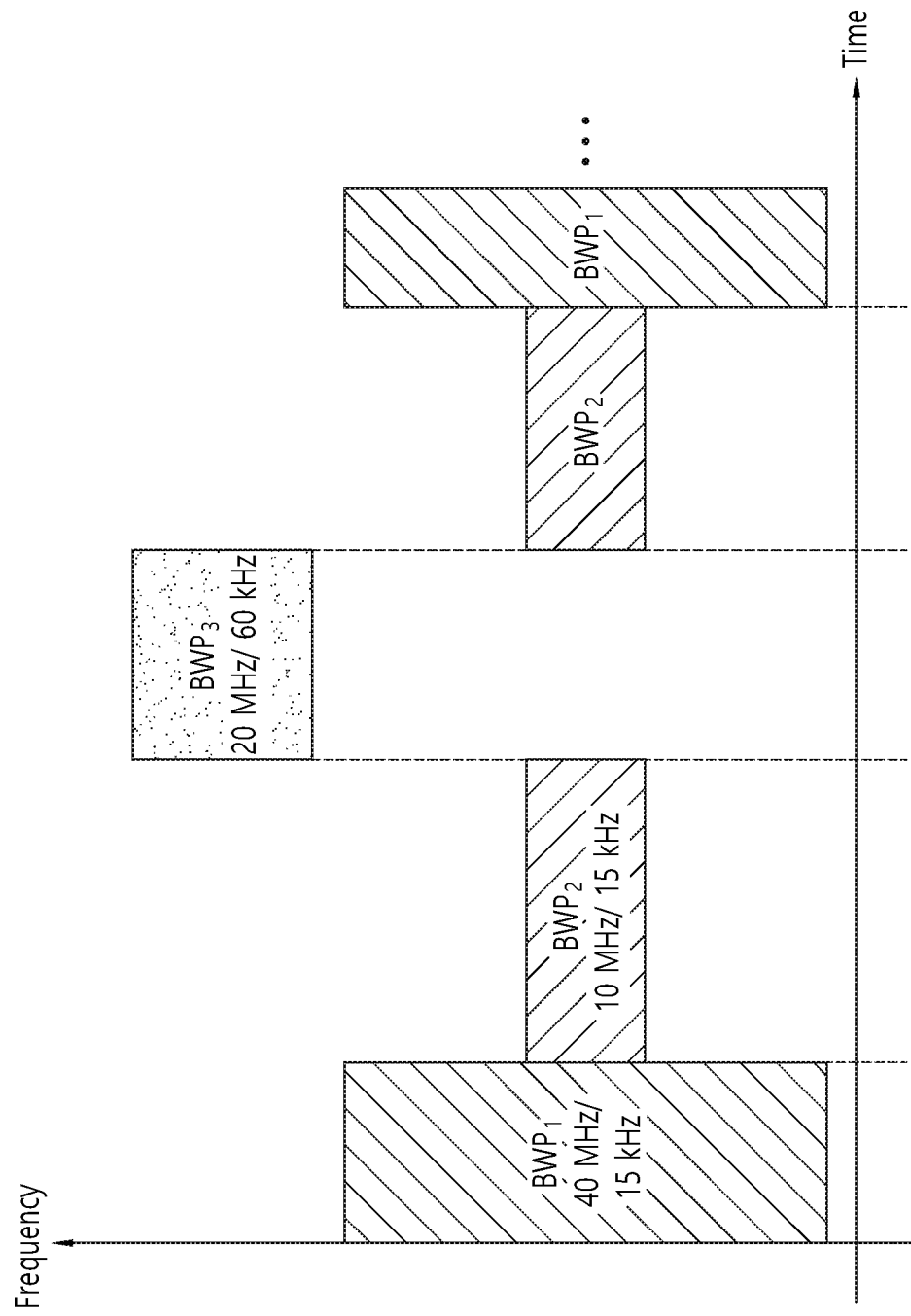
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Multi radio access technology (RAT) dual connectivity (MR-DC) is described. NG-RAN supports MR-DC operation whereby a multiple Rx/Tx UE in RRC CONNECTED is configured to utilize radio resources provided by two distinct schedulers. MR-DC is a generalization of the intra-E-UTRA DC. The two distinct schedulers are located in two different NG-RAN nodes connected via a non-ideal backhaul. One node of the two different NG-RAN nodes act as a master node (MN) and the other node of the two different NG-RAN nodes act as a secondary node (SN). That is, one scheduler is located in the MN, and the other scheduler is located in the SN. The two different NG-RAN provides either E-UTRA access (i.e. if the NG-RAN node is an ng-eNB) or NR access (i.e. if the NG-RAN node is a gNB). En-gNB is a node providing NR user plane and control plane protocol terminations towards the UE, and acting as SN in E-UTRAN-NR dual connectivity (EN-DC). Ng-eNB is a node providing E-UTRA user plane and control plane protocol terminations towards the UE, and connected via the NG interface to the 5GC. The MN and SN are connected via a network interface and at least the MN is connected to the core network. In this specification, MR-DC is designed based on the assumption of non-ideal backhaul between the different nodes but can also be used in case of ideal backhaul.

Figure 9:
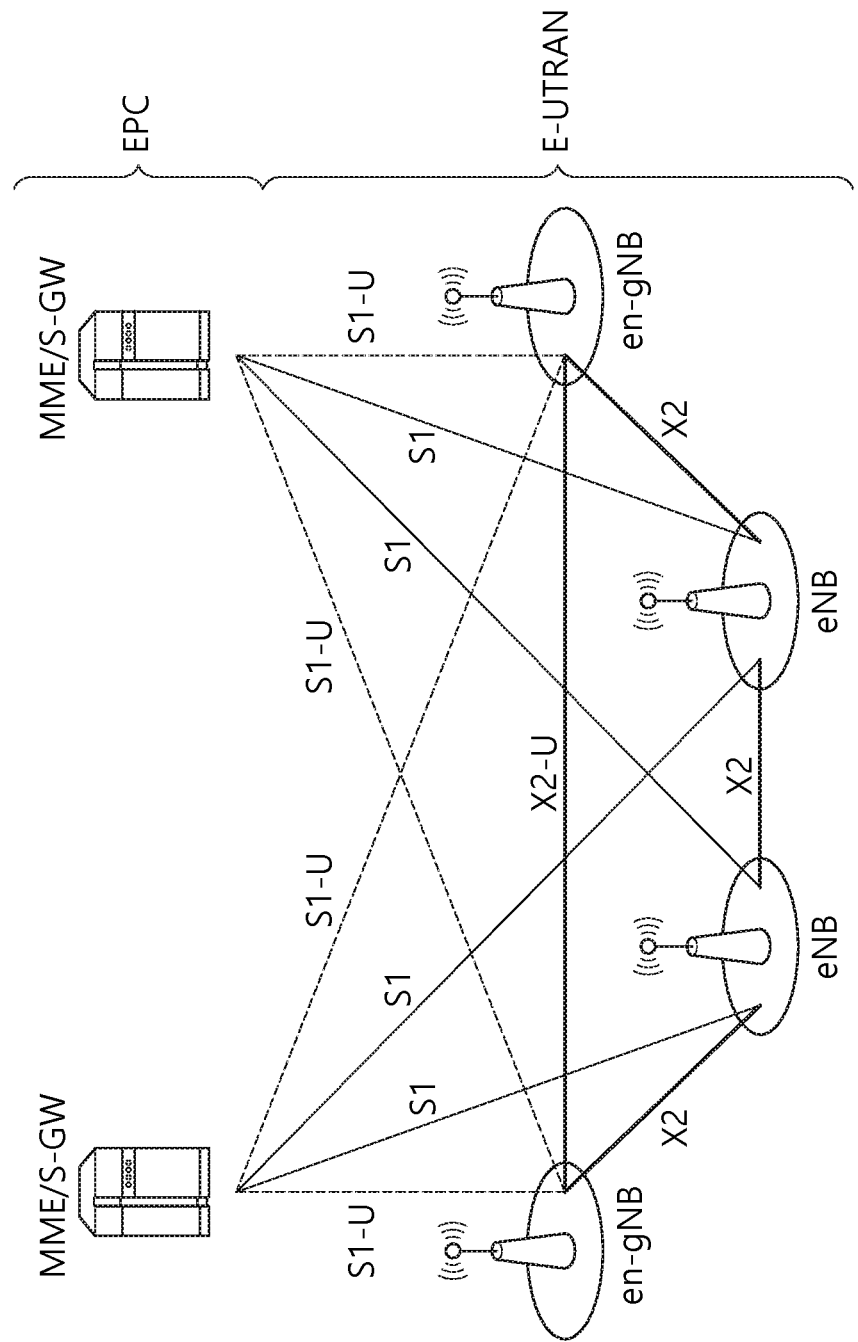
FIG. 9 shows an EN-DC architecture.

FIG. 9 shows an EN-DC architecture. E-UTRAN supports MR-DC via EN-DC, in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

NG-RAN supports NG-RAN E-UTRA-NR dual connectivity (NGEN-DC), in which a UE is connected to one ng-eNB that acts as a MN and one gNB that acts as a SN. The ng-eNB is connected to the 5GC and the gNB is connected to the ng-eNB via the Xn interface.

NG-RAN supports NR-E-UTRA dual connectivity (NE-DC), in which a UE is connected to one gNB that acts as a MN and one ng-eNB that acts as a SN. The gNB is connected to 5GC and the ng-eNB is connected to the gNB via the Xn interface.

UE category is described. The UE category, which is represented by the field ue-Category, defines a combined UL and DL capability. Table 5 shows DL physical layer parameter values set by the field ue-Category.

TABLE 5

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64QAM) 75376 (2 layers, 64QAM) | 3654144 | 2 or 4 |
| Category 7 | 301504 | 149776 (4 layers, 64QAM) 75376 (2 layers, 64QAM) | 3654144 | 2 or 4 |
| Category 8 | 2998560 | 299856 | 35982720 | 8 |
| Category 9 | 452256 | 149776 (4 layers, 64QAM) 75376 (2 layers, 64QAM) | 5481216 | 2 or 4 |
| Category 10 | 452256 | 149776 (4 layers, 64QAM) 75376 (2 layers, 64QAM) | 5481216 | 2 or 4 |
| Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |

TABLE 5-continued

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |

Table 6 shows UL physical layer parameter values set by the field ue-Category.

TABLE 6

| UE Category | Maximum number of UL-SCH transport block bits transmitted within a TTI | Maximum number of bits of an UL-SCH transport block transmitted within a TTI | Support for 64QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |
| Category 11 | 51024 | 51024 | No |
| Category 12 | 102048 | 51024 | No |

Referring to Table 5, each UE category for DL defines a total number of soft channel bits. The total number of soft channel bits defines a total number of downlink shared channel (DL-SCH) soft channel bits available for HARQ processing. This number does not include the soft channel bits required by the dedicated broadcast HARQ process for the decoding of system information.

As described above, in LTE/LTE-A, the total number of soft channel bits, which may be simply referred as soft buffer size, is defined based on UE category. In NR, there are too many elements for defining UE category, which may lead increase of the number of UE categories. Therefore, UE category may not be defined in NR.

Hereinafter, the present invention proposes a method or handling a soft buffer when dual connectivity is configured between (LTE) and NR.

When a UE supports dual connectivity between LTE and NR, a UE may need to indicate UE category which can be jointly or independently reported between LTE and NR.

In terms of UE category, the following approaches may be considered.

(1) Independent UE category between LTE and NR: In this approach, a UE may report two different UE categories to LTE and NR, respectively. The UE may also indicate LTE-NR dual connectivity capability. Any combination between LTE carrier and NR carrier may be possible for dual connectivity. The UE may also indicate set of supported band combinations for LTE-NR dual connectivity. In this approach, the UE category for LTE may utilize one of UE category defined in LTE, and the UE category for NR may utilize one of UE category defined for NR.

In this approach, the capability for NR and LTE may not be shared, other than capabilities related to LTE-NR dual connectivity. The capabilities related to LTE-NR dual connectivity may include a capability related to power. Capabilities which are not shared, i.e. separate capabilities for LTE and NR respectively, may include soft buffer, maximum transport block size (TBS) supported in each RAT, etc.

(2) A new UE category may be defined, and the new UE category may include at least one of the followings. But the new UE category is not limited by the followings.
Maximum TBS in a TTI supported by LTE or by turbo decoder
Maximum TBS in a TTI supported by NR or by low-density parity-check (LDPC) decoder
Numerologies supported by NR
Processing time required for NR
Soft buffer size In this approach, the capability related to handling maximum TBS may not be shared between LTE and NR. However, in this approach, the capability related to soft buffer may be shared between LTE and NR. In this approach, a UE category may be defined as sum of peak data rate in LTE and NR respectively, and the required soft buffer may be defined as sum of soft buffer sizes to support the maximum peak data rate of LTE and NR respectively.

The UE category may be defined by one of two approaches described above depending on UE capability. If the UE can support shared soft buffer between LTE and NR, the second approach, i.e. defining new UE category, may be used. In this case, the UE may report its category following the second approach. Otherwise, the first approach, i.e. independent UE category for LTE and NR respectively, may be used. In this case, the UE may report its category following the first approach. Even when the second approach is used, UE category and capability of LTE may follow one of UE categories defined in LTE.

Considering different approaches of UE category definition described above, in terms of soft buffer sharing/handling for LTE-NR dual connectivity, the following approaches may be considered.

(1) Hard Split

This approach is aligned with the first approach of UE category definition where UE categories for LTE and NR are reported independently. In this approach, soft buffer for LTE and NR may be defined by UE category for each RAT. Thus, soft buffer may not be shared between LTE and NR carrier groups (CGs), and the size of soft buffer may be defined by the UE category for each RAT. In this approach, the UE category for each RAT may be exchanged between LTE and NR (i.e. between eNB and gNB). Furthermore, even in this approach, the UE may also indicate whether the network can assume that at least some UE capabilities can be shared, and which capabilities can be shared. For example, the UE may report to the network that the soft buffer can be shared. If the UE can support soft buffer sharing between LTE and NR, even though the UE categories are independently reported to each RAT, the total (i.e. sum of soft buffer for LTE and NR) soft buffer may be shared between two CGs. The total soft buffer size may also be reported by the UE to master cell group (MCG) (and/or secondary cell group (SCG)). When the UE supports soft buffer sharing even though the UE categories are independently reported to each RAT, the sharing mechanism may follow either one of semi-static split or dynamic split, which will be described below.

(2) Semi-Static Partitioning

Another approach is to partition soft buffer sizes between two RATs semi-statically when second CG is configured. To support this option, the UE may report its category and/or soft buffer capabilities to both RATs which can be shared. Or, the UE may indicate the capability that the UE supports soft buffer sharing between two RATs. When soft buffer can be shared, soft buffer may be partitioned between two RATs. Partitioning of the soft buffer may be done by the following approaches. But, partitioning of the soft buffer is not limited by the following approaches, and some combinations of the following approaches may also be considered.

Option 1: MCG may assign soft buffer size of the UE to LTE CG from one of candidate soft buffer sizes. The candidate soft buffer sizes may include soft buffer sizes based on UE categories in LTE. For example, the candidate soft buffer sizes may include soft buffer sizes for UE category 1, 2, and so on, in LTE. In other words, the soft buffer which can be assigned to LTE may follow soft buffer size defined based on one of UE categories in LTE. This is to minimize the impact on soft buffer handling and rate matching in perspective of LTE. Similar approach may be done for NR side as well. If there are remaining soft buffer size after assigning soft buffer size to LTE and NR respectively, it's up to the UE how to handle/utilize unassigned soft buffer size. Alternatively, soft buffer size for NR may be more flexible, which means that any soft buffer size for NR may be supported.

Option 2: MCG may divide UE soft buffer size between LTE and NR by ratio. For example, 20% of the soft buffer size may be assigned to LTE and 80% of the soft buffer size may be assigned to NR. Once the soft buffer size for each RAT is determined, in LTE, soft buffer size for limited buffer rate matching (LBRM) may follow the closest soft buffer sizes among soft buffer sizes based on UE categories in LTE. For example, it is assumed that 20% of soft buffer size is 2000000 for LTE. In this case, the closest soft buffer size based on UE categories in LTE is UE category 4, which corresponds to soft buffer size of 1827072. Accordingly, UE category 4 may be used for soft buffer handling in LTE. For selecting the closest UE category & soft buffer size in LTE, the UE may select the closest UE category or the UE category whose soft buffer size is small or equal to the assigned soft buffer size (which are the highest UE category if there are multiple UE categories satisfying the condition).

Option 3: Soft buffer size per carrier for LTE may be defined as (total soft buffer size of the UE/(M1+M2)). M1 is the number of maximum configurable carriers in LTE for soft buffer dimensioning. M1 may be inferred from UE capabilities or UE category report, or may be configured by higher layer. Similarly, M2 is the number of maximum configurable carriers in NR for soft buffer dimensioning. Even though a UE can be configured with carriers more than the maximum configurable carriers, this number is used for soft buffer dimensioning only (i.e. a reference number of carriers for soft buffer dimensioning). The total soft buffer size assigned to LTE may be (soft buffer size per carrier for LTE*M1). Total soft buffer size assigned to NR may be (total soft buffer size of the UE−total buffer size assigned to LTE). Similar to Option 1 or Option 2 described above, the closest soft buffer size from one of UE categories in LTE may be selected after assignment.

Option 4: Option 4 is similar to Option 3. However, instead of equal weight between LTE and NR, different weight may be considered between LTE and NR. That is, the total soft buffer size assigned to LTE may be defined as (soft buffer size per carrier for LTE*M1)*K. K is the scaling factor. In this option, in terms of soft buffer handling, the soft buffer size may be soft channel bit size from one of UE categories in LTE. Thus, the soft buffer size may be smaller or larger than that of actually assigned soft buffer. Alternatively, soft buffer size for LTE may also be also flexible, and rate matching behavior may be defined as range operation. That is, instead of utilizing fixed size for soft channel bit, any number within range may be handled in a same way. For example, soft buffer size between UE category 4 and 5 may be treated as if UE category 4. Alternatively, the range may be defined in the middle between consecutive UE categories and in the middle between the next consecutive UE categories.

When semi-static partitioning is used, the partitioning may be done as follows.

Semi-static partitioning may be done at SCG configuration. The partitioning may be reconfigured, but may not change dynamically regardless of the number of configured carriers in each CG.

Semi-static partitioning may be done at every carrier configuration, i.e. either MCG or SCG. This may require component carrier (CC) configuration via MCG all the time or the configuration of CC needs to be done via CG which also indicates semi-static partitioning of soft buffer sizes. Considering that SCG may configure carriers independently (i.e. MCG does not know how many carriers are configured in SCG) and also SCG may partition soft size buffer based on active carriers rather than configured carriers, this approach may lead some ambiguity in soft buffer sizes. In this case, it may be assumed that partitioning is done at SCG configuration/de-configuration.

(3) Dynamic Partitioning

When MCG can configure carrier for SCG (i.e. MCG knows all the configured carriers) or dynamic resource sharing between MCG and SCG is possible, partitioning of dynamic soft buffer size may be considered depending on either configured carriers and/or activated carriers. When dynamic partitioning is considered, the following approaches may be considered.

Option 1: Soft buffer size may be equally divided into the number of carriers in both CGs. That is, soft buffer size per carrier is (total soft buffer size/(N1+N2)). N1 is the number of carriers in LTE. N2 is the number of carriers in NR.

Option 2: Soft buffer size may change between LTE and NR based on ratio. The soft buffer size may be partitioned between LTE and NR dynamically via media access control (MAC) control element (CE) or DCI.

Option 3: Soft buffer size per carrier may be determined by following Option 3 or 4 in "(2) Semi-static partitioning". However, the total soft buffer size assigned to LTE may be defined as (soft buffer size per carrier*N1). N1 is the number of carriers configured and/or activated in LTE CG. In other words, soft buffer size for each carrier may be determined based on a maximum number of configurable carriers, and assignment may be done based on the actually configured number of carriers. In this option, different weight may be considered for each carrier depending on the number of configured carriers in LTE. For example, higher weight may be configured when the number of configured carriers in LTE is small, whereas lower weight may be configured when the number of configured carriers in LTE is close to the maximum number of configurable carriers used in soft buffer dimensioning.

Option 4: The total soft buffer size assigned to LTE may be defined as (total soft buffer size of the UE−required soft buffer size for NR). Required soft buffer size for NR may be defined by at least one of the number of HARQ processes, max TBS per TTI, or the number of configured carriers. Similarly, the required soft buffer size for LTE may be defined based on max TBS (by UE category in LTE or maximum TBS by UE supported capability) per TTI, number of HARQ processes, processing time, and configured number of carriers. Different max TBS per TTI may be defined per different BWPs. Or, max TBS per TTI may be a function of K*minimum bandwidth of a BWP. In other words, soft buffer size for LTE may be assigned by subtracting minimum required soft buffer size for NR form the total soft buffer size of the UE. To support this, a UE may report the required soft buffer size for NR based on the configuration. This may be done after semi-static partitioning of soft buffer size between two RATs, and the remaining soft buffer size in NR, if present, may be borrowed by LTE.

Figure 10:
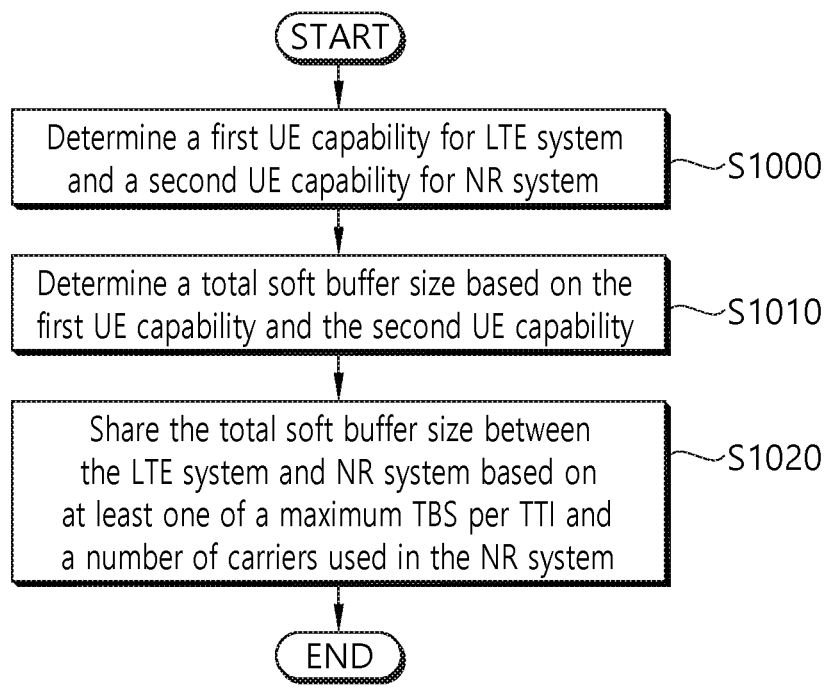
FIG. 10 shows a method for handling a soft buffer size by a UE according to an embodiment of the present invention.

FIG. 10 shows a method for handling a soft buffer size by a UE according to an embodiment of the present invention. The present invention described above may be applied to this embodiment. In this embodiment, the UE is connected to both LTE and NR in dual connectivity.

In step S1000, the UE determines a first UE capability for the LTE system and a second UE capability for the NR system. The first capability for the LTE system may be defined based on a UE category in the LTE system or a peak data rate in the LTE system. The second capability for the NR system may be defined based on a peak data rate in the NR system.

In step S1010, the UE determines a total soft buffer size based on the first UE capability and the second UE capability.

In step S1020, the UE shares the total soft buffer size between the LTE system and the NR system based on at least one of a maximum TB S per TTI and a number of carriers used in the NR system. The maximum TBS per TTI may be defined per BWP. Or, the maximum TBS per TTI may be a function of a minimum bandwidth of a BWP.

The sharing the total soft buffer size between the LTE system and the NR system may comprise determining a required soft buffer size for the NR system based on at least one of the maximum TBS per TTI and the number of carriers used in the NR system, and assigning a soft buffer size which is remained after subtracting the required soft buffer size for the NR system from the total soft buffer size to the LTE system. The required soft buffer size for the NR system may be reported to a network.

Figure 11:
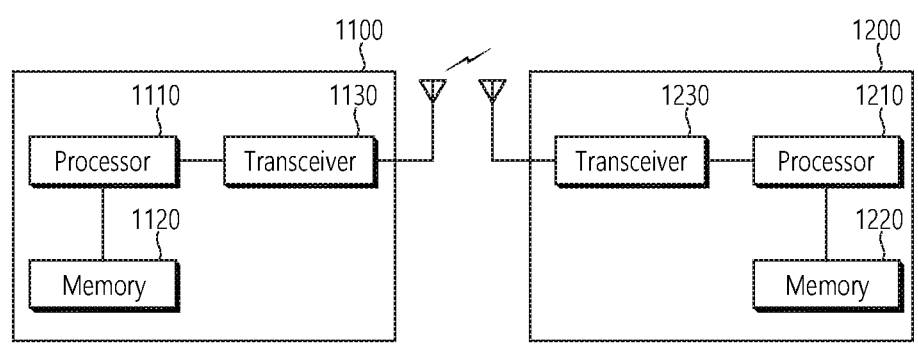
FIG. 11 shows a wireless communication system to implement an embodiment of the present invention.

FIG. 11 shows a wireless communication system to implement an embodiment of the present invention.

A UE 1100 includes a processor 1110, a memory 1120 and a transceiver 1130. The processor 1110 may be configured to implement proposed functions, procedures and/or methods described in this description. Layers of the radio interface protocol may be implemented in the processor 1110. The memory 1120 is operatively coupled with the processor 1110 and stores a variety of information to operate the processor 1110. The transceiver 1120 is operatively coupled with the processor 1110, and transmits and/or receives a radio signal.

A network node 1200 includes a processor 1210, a memory 1220 and a transceiver 1230. The processor 1210 may be configured to implement proposed functions, procedures and/or methods described in this description. Layers of the radio interface protocol may be implemented in the processor 1210. The memory 1220 is operatively coupled with the processor 1210 and stores a variety of information to operate the processor 1210. The transceiver 1230 is operatively coupled with the processor 1210, and transmits and/or receives a radio signal.

The processors 1110, 1210 may include application-specific integrated circuit (ASIC), other chipset, logic circuit and/or data processing device. The memories 1120, 1220 may include read-only memory (ROM), random access memory (RAM), flash memory, memory card, storage medium and/or other storage device. The transceivers 1120, 1230 may include baseband circuitry to process radio frequency signals. When the embodiments are implemented in software, the techniques described herein can be implemented with modules (e.g., procedures, functions, and so on) that perform the functions described herein. The modules can be stored in memories 1120, 1220 and executed by processors 1110, 1210. The memories 1120, 1220 can be implemented within the processors 1110, 1210 or external to the processors 1110, 1210 in which case those can be communicatively coupled to the processors 1110, 1210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for handling a soft buffer size by a user equipment (UE) in a wireless communication system, wherein the UE is connected to both a first system and a second system in dual connectivity, the method comprising:
determining a first UE capability for the first system and a second UE capability for the second system;
determining a total soft buffer size based on the first UE capability and the second UE capability; and
sharing the total soft buffer size between the first system and the second system based on at least one of a maximum transport block size (TBS) per transmission time interval (TTI) and a number of carriers used in the second system,
wherein the maximum TBS per TTI is defined per bandwidth part (BWP).

2. The method of claim 1, wherein the sharing the total soft buffer size between the first system and the second system comprises:
   determining a required soft buffer size for the second system based on at least one of the maximum TBS per TTI and the number of carriers used in the second system; and
   assigning a soft buffer size which is remained after subtracting the required soft buffer size for the second system from the total soft buffer size to the first system.

3. The method of claim 2, wherein the required soft buffer size for the second system is reported to a network.

4. The method of claim 1, wherein the maximum TBS per TTI is a function of a minimum bandwidth of a BWP.

5. The method of claim 1, wherein the first UE capability for the first system is defined based on a UE category in the first system or a peak data rate in the first system.

6. The method of claim 1, wherein the second UE capability for the second system is defined based on a peak data rate in the second system.

7. The method of claim 1, wherein the first system is a long-term evolution (LTE) system, and
   wherein the second system is a new radio access technology (NR) system.

8. The method of claim 1, wherein the UE is in communication with at least one of a mobile device, a network, and/or autonomous vehicles other than the UE.

9. A user equipment (UE) configured to operate in a wireless communication system, wherein the UE is configured to be connected to both a first system and a second system in dual connectivity, the UE comprising:
   a memory;
   a transceiver; and
   a processor, operably coupled to the memory and the transceiver, that is configured to perform operations comprising:
      determining a first UE capability for the first system and a second UE capability for the second system;
      determining a total soft buffer size based on the first UE capability and the second UE capability; and
      sharing the total soft buffer size between the first system and the second system based on at least one of a maximum transport block size (TBS) per transmission time interval (TTI) and a number of carriers used in the second system,
      wherein the maximum TBS per TTI is defined per bandwidth part (BWP).

10. The UE of claim 9, wherein the sharing the total soft buffer size between the first system and the second system comprises:
    determining a required soft buffer size for the second system based on at least one of the maximum TBS per TTI and the number of carriers used in the second system; and
    assigning a soft buffer size which is remained after subtracting the required soft buffer size for the second system from the total soft buffer size to the first system.

11. The UE of claim 10, wherein the required soft buffer size for the second system is reported to a network.

12. The UE of claim 9, wherein the maximum TBS per TTI is a function of a minimum bandwidth of a BWP.

13. The UE of claim 9, wherein the first UE capability for the first system is defined based on a UE category in the first system or a peak data rate in the first system.

14. The UE of claim 9, wherein the second UE capability for the second system is defined based on a peak data rate in the second system.

* * * * *